United States Patent
Watanabe

(10) Patent No.: US 12,451,921 B2
(45) Date of Patent: Oct. 21, 2025

(54) RADIO-FREQUENCY MODULE AND COMMUNICATION APPARATUS

(71) Applicant: Murata Manufacturing Co., Ltd., Kyoto (JP)

(72) Inventor: Daisuke Watanabe, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 330 days.

(21) Appl. No.: 18/449,043

(22) Filed: Aug. 14, 2023

(65) Prior Publication Data
US 2024/0072837 A1  Feb. 29, 2024

(30) Foreign Application Priority Data
Aug. 26, 2022 (JP) .................. 2022-134904

(51) Int. Cl.
*H04B 1/44* (2006.01)
(52) U.S. Cl.
CPC ...................... *H04B 1/44* (2013.01)
(58) Field of Classification Search
CPC . H04B 1/44; H04B 1/00; H04B 1/006; H04B 1/0458; H04B 1/1027; H04B 1/18; H04B 1/525; H04B 2001/0408
See application file for complete search history.

(56) References Cited

U.S. PATENT DOCUMENTS

| | | | |
|---|---|---|---|
| 10,505,700 B1 * | 12/2019 | Lan ........................ | H04B 1/525 |
| 11,239,873 B2 * | 2/2022 | Mori .................... | H03H 7/0115 |
| 11,509,336 B2 * | 11/2022 | Hitomi ................. | H04B 1/0064 |
| 11,962,340 B2 * | 4/2024 | Muto .................... | H04B 1/0458 |
| 2010/0295629 A1 * | 11/2010 | Klemens ................ | H03F 3/245 |
| | | | 333/126 |
| 2017/0104509 A1 * | 4/2017 | Khlat ..................... | H04B 1/005 |
| 2018/0006618 A1 * | 1/2018 | Mohta .................. | H04B 1/0475 |
| 2018/0131501 A1 * | 5/2018 | Little .................... | H04B 1/0064 |
| 2020/0007096 A1 * | 1/2020 | Kita ........................ | H03H 7/46 |
| 2020/0220568 A1 | 7/2020 | Watanabe | |
| 2020/0228151 A1 * | 7/2020 | Naniwa ................ | H05K 1/0237 |
| 2021/0135695 A1 * | 5/2021 | Uejima ................ | H04B 1/0057 |
| 2021/0258024 A1 * | 8/2021 | Miyazaki ............. | H04B 1/0067 |
| 2021/0376867 A1 * | 12/2021 | Tada ..................... | H04B 1/006 |

(Continued)

FOREIGN PATENT DOCUMENTS

WO    2019/054176 A1    3/2019

*Primary Examiner* — Cindy Trandai
(74) *Attorney, Agent, or Firm* — McDonald Hopkins LLC

(57) ABSTRACT

A radio-frequency module includes low-noise amplifiers, switches, filters, and inductors. The switch includes a common terminal and selection terminals. The filter is connected to the selection terminal. Another filter is connected to another selection terminal. The inductor is connected between the common terminal and an input end of the low-noise amplifier. Another inductor is connected between another filter and an input end of the low-noise amplifier. Another switch is connected between a receive path and ground. The receive path links the common terminal and the input end of the low-noise amplifier to each other. Still another switch is connected between a receive path and ground. The receive path links the filter and the input end of the low-noise amplifier to each other. Still another inductor is connected between the receive path and the receive path.

12 Claims, 8 Drawing Sheets

(56) References Cited

U.S. PATENT DOCUMENTS

| | | | |
|---|---|---|---|
| 2022/0021357 A1* | 1/2022 | Takeuchi | H04B 1/40 |
| 2022/0021404 A1* | 1/2022 | Horita | H04B 1/006 |
| 2022/0069775 A1* | 3/2022 | Balteanu | H04B 1/40 |
| 2022/0311456 A1* | 9/2022 | Yamaguchi | H04B 1/006 |
| 2023/0102723 A1* | 3/2023 | Ni | H04B 1/401 |
| | | | 455/552.1 |
| 2023/0299798 A1* | 9/2023 | Zhang | H04B 1/0064 |
| | | | 455/552.1 |

* cited by examiner

RADIO-FREQUENCY MODULE AND COMMUNICATION APPARATUS

CROSS REFERENCE TO RELATED APPLICATION

This application claims priority from Japanese Patent Application No. 2022-134904 filed on Aug. 26, 2022. The content of this application is incorporated herein by reference in its entirety.

BACKGROUND ART

The present disclosure relates to a radio-frequency module, and a communication apparatus.

International Publication No. 2019/054176 (FIG. 4B) discloses a front-end module (radio-frequency module) including a first low-noise amplifier, a second low-noise amplifier, a first filter, a second filter, a switch, a first matching circuit, and a second matching circuit. The switch switches connections between the first low-noise amplifier and the first filter, and switches connections between the second low-noise amplifier and the second filter. The first matching circuit is connected between the switch and the first low-noise amplifier. The second matching circuit is connected between the switch and the second low-noise amplifier.

BRIEF SUMMARY

The radio-frequency module disclosed in International Publication No. 2019/054176 includes a first path and a second path. The first path links the first filter and the first low-noise amplifier to each other. The second path links the second filter and the second low-noise amplifier to each other. Of the first and second paths, a path through which to transmit a radio-frequency signal has an unstable potential in a direct current (DC) sense, which may lead to deterioration of the transient response characteristics of amplifier output.

The present disclosure is directed to addressing the above-mentioned issue. The present disclosure provides a radio-frequency module and a communication apparatus that allow for reduced deterioration of the transient response characteristics of amplifier output.

A radio-frequency module according to an aspect of the present disclosure includes a first amplifier, a second amplifier, a first switch, a first filter, a second filter, a third filter, a first inductor, a second inductor, a second switch, a third switch, and a third inductor. The first switch includes a first common terminal, a first selection terminal, and a second selection terminal. The first filter is connected to the first selection terminal. The second filter is connected to the second selection terminal. The first inductor is connected between the first common terminal and an input end of the first amplifier. The second inductor is connected between the third filter and an input end of the second amplifier. The second switch is connected between a first path and ground. The first path links the first common terminal and the input end of the first amplifier to each other. The third switch is connected between a second path and ground. The second path links the third filter and the input end of the second amplifier to each other. The third inductor is connected between the first path and the second path.

The present disclosure makes it possible to provide a radio-frequency module and a communication apparatus that allow for reduced deterioration of the transient response characteristics of amplifier output.

DETAILED DESCRIPTION

Figure 1:
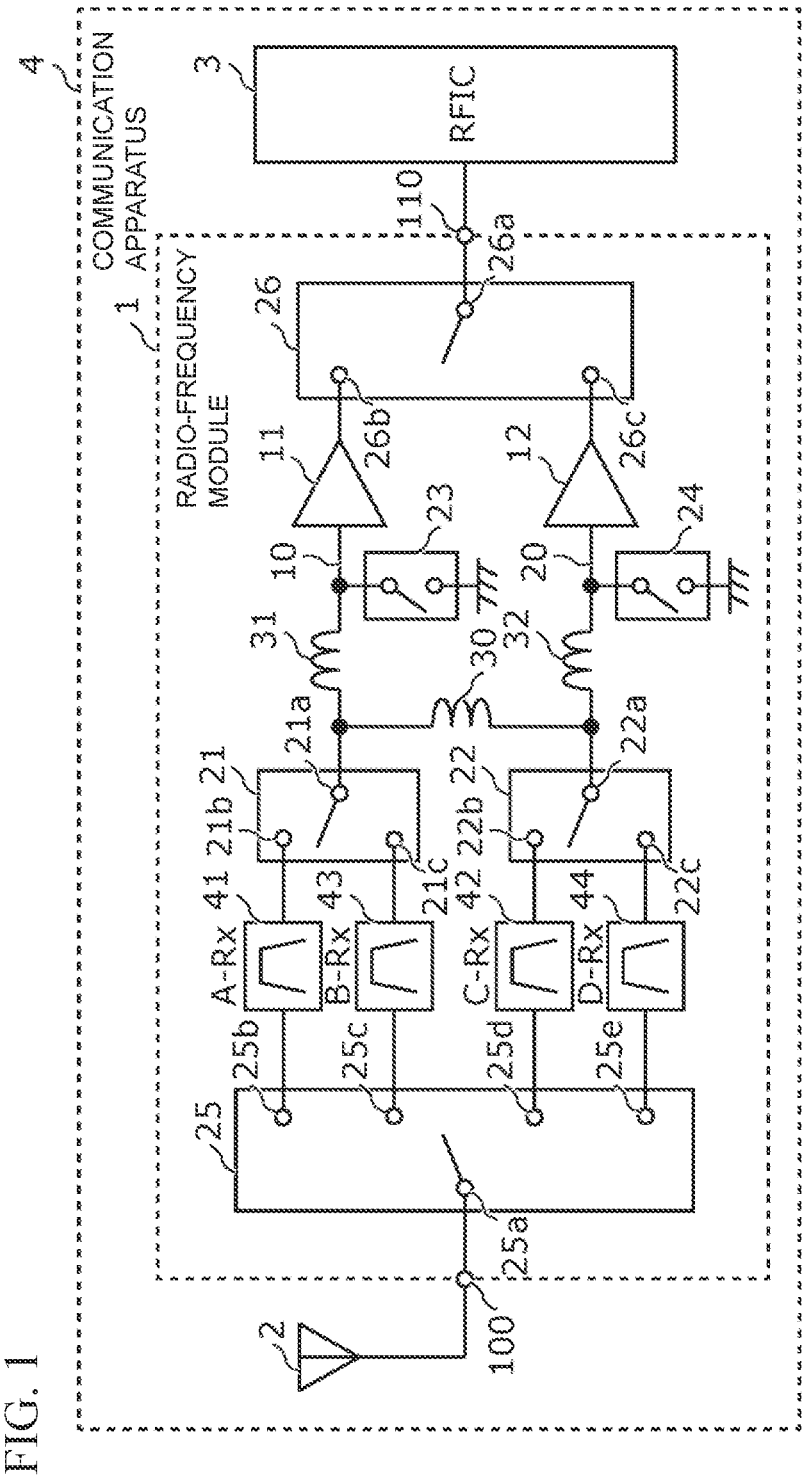
FIG. 1 is a circuit diagram of a radio-frequency module and a communication apparatus according to an embodiment.

Embodiments of the present disclosure will be described below in detail. The embodiments described below each represents a generic or specific example. Features presented in the following embodiments, such as numerical values, shapes, materials, components, and the arrangement and connection of components, are illustrative only and not intended to be limiting of the present disclosure. Of the components presented in the following description of embodiments and modifications, those components not described in independent claims will be described as optional components. The sizes of components illustrated in the drawings or the ratios between the sizes of these components are not necessary drawn to scale. Throughout the drawings, identical reference signs are used to designate substantially identical features, and repetitive descriptions will be sometimes omitted or simplified.

As used herein, "parallel", "perpendicular", or other such terms indicative of the relationship between elements, and "rectangular" or other such terms indicative of a shape of an element are not intended to represent only their strict meanings but are meant to also include their substantial equivalents, for example, equivalents with deviations or differences of about a few percent.

As used herein, the term "connected" means not only that circuit elements are directly connected to each other by a connection terminal or a wiring conductor but also that circuit elements are electrically connected to each other with another circuit element interposed therebetween. Expressions such as "connected between A and B" or "connected in between A and B" mean being connected to A and B in a path that links A and B to each other.

As used herein, expressions such as "in plan view of a substrate" means that the substrate and circuit elements mounted at the substrate are viewed in an orthographic projection onto a plane parallel to a major face of the substrate.

As used herein with regard to how components are disposed, expressions such as "a component is disposed at a substrate" include that the component is disposed over a major face of the substrate, and that the component is disposed in the substrate. Expressions such as "a component is disposed over a major face of a substrate" include not only that the component is disposed in contact with the major face of the substrate, but also that the component is disposed above the major face without necessarily contact with the major face (e.g., the component is mounted over another component disposed in contact with the major face). Expressions such as "a component is disposed at a major face of a substrate" may include that the component is disposed in a recess defined in the major face. Expressions such as "a component is disposed in a substrate" include, in addition to the meaning that the component is encapsulated in the module's substrate, the following meanings: the component is disposed in its entirely between both major faces of the substrate but not covered in part by the substrate; and the component is located only in part in the substrate.

As used herein, the term "path" means a transmission line including, for example, a wiring line in which a radio-frequency signal propagates, an electrode directly connected to the wiring line, and a terminal directly connected to the wiring line or the electrode.

As used herein, expressions such as "a component A is disposed in series with a path B" mean that the signal input end and the signal output end of the component A are both connected to a wiring line, an electrode, or a terminal that constitutes the path B.

Embodiment

1. Respective Configurations of Radio-Frequency Module 1 and Communication Apparatus 4

Respective circuit configurations of a radio-frequency module 1 and a communication apparatus 4 according to an embodiment of the present disclosure are described below with reference to FIG. 1. FIG. 1 illustrates the respective circuit configurations of the radio-frequency module 1 and the communication apparatus 4 according to the embodiment.

1.1. Circuit Configuration of Communication Apparatus 4

First, the circuit configuration of the communication apparatus 4 according to the embodiment is described below. The communication apparatus 4 is used in a communication system. The communication apparatus 4 is, for example, a mobile terminal such as a smartphone or a tablet computer. As illustrated in FIG. 1, the communication apparatus 4 includes the radio-frequency module 1, an antenna 2, and a radio-frequency integrated circuit (RFIC) 3.

The radio-frequency module 1 transmits (sends/receives) a radio-frequency signal between the antenna 2 and the RFIC 3. According to the embodiment, the radio-frequency module 1 transmits a receive signal, which is a non-limiting example of the radio-frequency signal. The radio-frequency module 1 may transmit a send signal, which is an example of the radio-frequency signal. A detailed circuit configuration of the radio-frequency module 1 will be described later.

The antenna 2 is connected to an antenna connection terminal 100 of the radio-frequency module 1. The antenna 2 receives an externally provided radio-frequency signal, and outputs the radio-frequency signal to the radio-frequency module 1. Alternatively, the antenna 2 may send a radio-frequency signal output from the radio-frequency module 1.

The RFIC 3 is an example of a signal processing circuit that processes a radio-frequency signal. Specifically, the RFIC 3 applies signal processing such as down-conversion to a receive signal input via a receive path of the radio-frequency module 1, and outputs the resulting receive signal to a baseband integrated circuit (BBIC) (not illustrated). The RFIC 3 may apply signal processing such as up-conversion to a send signal input from the BBIC, and outputs the resulting send signal to a send path of the radio-frequency module 1. The RFIC 3 includes a controller that controls switches, amplifiers, and other components of the radio-frequency module 1. The controller of the RFIC 3 controls, for example, a power supply voltage and a bias voltage that are to be supplied to amplifiers of the radio-frequency module 1.

Some or all of the functions of the controller of the RFIC 3 may be implemented outside of the RFIC 3. For example, some or all of such functions may be implemented in the BBIC or the radio-frequency module 1.

The circuit configurations depicted in FIG. 1 are illustrative only and not intended to be limiting. For example, the communication apparatus 4 may include no antenna 2. Alternatively, the communication apparatus 4 may include multiple antennas 2.

1.2. Circuit Configuration of Radio-Frequency Module 1

The circuit configuration of the radio-frequency module 1 according to the embodiment is now described below.

As illustrated in FIG. 1, the radio-frequency module 1 includes the following components: low-noise amplifiers 11 and 12, filters 41, 42, 43, and 44, switches 21, 22, 23, 24, 25, and 26, inductors 30, 31, and 32, the antenna connection terminal 100, and a signal output terminal 110.

The antenna connection terminal 100 is connected to the antenna 2. The antenna connection terminal 100 receives input of a receive signal received at the antenna 2.

The signal output terminal 110 is connected to the RFIC 3. A receive signal is output from the signal output terminal 110 after having transmitted through the radio-frequency module 1.

The low-noise amplifier 11 is an example of a first amplifier. The low-noise amplifier 11 is connected between the switch 21 and the switch 26. The low-noise amplifier 11 amplifies a receive signal of Band A and a receive signal of Band B that have been input from the antenna connection terminal 100. The low-noise amplifier 11 has an input end connected to one end of the inductor 31. The low-noise amplifier 11 has an output end connected to a selection terminal 26b of the switch 26.

The low-noise amplifier 12 is an example of a second amplifier. The low-noise amplifier 12 is connected between the switch 22 and the switch 26. The low-noise amplifier 12 amplifies a receive signal of Band C and a receive signal of Band D that have been input from the antenna connection terminal 100. The low-noise amplifier 12 has an input end connected to one end of the inductor 32. The low-noise amplifier 12 has an output end connected to a selection terminal 26c of the switch 26.

The switch 21 is an example of a first switch. The switch 21 includes a common terminal 21a (first common terminal), a selection terminal 21b (first selection terminal), and a selection terminal 21c (second selection terminal). The switch 21 switches connections between the common terminal 21a and the selection terminal 21b, and switches connections between the common terminal 21a and the selection terminal 21c. The common terminal 21a is connected to the other end of the inductor 31 and to one end of the inductor 30. The selection terminal 21b is connected to one end of the filter 41. The selection terminal 21c is connected to one end of the filter 43. The switch 21 is implemented by, for example, a single-pole double-throw (SPDT) switching circuit.

The switch 22 is an example of a fourth switch. The switch 22 includes a common terminal 22a (second common terminal), a selection terminal 22b (third selection terminal), and a selection terminal 22c (fourth selection terminal). The switch 22 switches connections between the common terminal 22a and the selection terminal 22b, and switches connections between the common terminal 22a and the selection terminal 22c. The common terminal 22a is connected to the other end of the inductor 32 and to the other end of the inductor 30. The selection terminal 22b is connected to one end of the filter 42. The selection terminal 22c is connected to one end of the filter 44. The switch 22 is implemented by, for example, a SPDT switching circuit.

The filter 41 is an example of a first filter. The filter 41 has a pass band including at least part of Band A. The filter 43 is an example of a second filter. The filter 43 has a pass band including at least part of Band B. The filter 42 is an example of a third filter. The filter 42 has a pass band including at least part of Band C. The filter 44 is an example of a fourth filter. The filter 44 has a pass band including at least part of Band D.

Bands A to D are frequency bands for a communication system to be developed by use of a radio access technology (RAT) predefined by a standard body or other organization (examples of which include 3GPP (registered trademark) and the Institute of Electrical and Electronics Engineers (IEEE)). Non-limiting examples of the communication system may include a 5th Generation New Radio (5G-NR) system, a Long Term Evolution (LTE) system, and a Wireless Local Area Network (WLAN) system.

The inductor 31 is an example of a first inductor. The inductor 31 is connected between the common terminal 21a and the input end of the low-noise amplifier 11. The inductor 32 is an example of a second inductor. The inductor 32 is connected between the common terminal 22a and the input end of the low-noise amplifier 12. The inductor 30 is an example of a third inductor. The inductor 30 is connected between a receive path 10 (first path) and a receive path 20 (second path). The receive path 10 links the common terminal 21a, and the input end of the low-noise amplifier 11 to each other. The receive path 20 links the common terminal 22a, and the input end of the low-noise amplifier 12 to each other.

The switch 23 is an example of a second switch. The switch 23 is connected between the receive path 10 and ground. The switch 24 is an example of a third switch. The switch 24 is connected between the receive path 20 and ground.

The switch 25 includes a common terminal 25a, and selection terminals 25b, 25c, 25d, and 25e. The switch 25 switches connections between the common terminal 25a and one of the selection terminals 25b to 25e. The common terminal 25a is connected to the antenna connection terminal 100. The selection terminal 25b is connected to the other end of the filter 41. The selection terminal 25c is connected to the other end of the filter 43. The selection terminal 25d is connected to the other end of the filter 42. The selection terminal 25e is connected to the other end of the filter 44. The switch 25 is implemented by, for example, a single-pole 4-throw (SP0T) switching circuit.

The switch 26 includes a common terminal 26a, and the selection terminals 26b and 26c. The switch 26 switches connections between the common terminal 26a and the selection terminal 26b, and switches connections between the common terminal 26a and the selection terminal 26c. The common terminal 26a is connected to the signal output terminal 110. The selection terminal 26b is connected to the output end of the low-noise amplifier 11. The selection terminal 26c is connected to the output end of the low-noise amplifier 12. The switch 26 is implemented by, for example, a SPDT switching circuit.

The switches 21 to 26 are implemented by multiple switching devices such as field effect transistors (FETs).

The radio-frequency module 1 according to the embodiment may include the switches 25 and 26 disposed outside of the radio-frequency module 1, or may include no switches 25 and 26. If the radio-frequency module 1 includes no switch 25, the antenna connection terminal 100 may be connected to the other end of the filter 41, the other end of the filter 42, the other end of the filter 43, and the other end of the filter 44. If the radio-frequency module 1 includes no switch 26, the signal output terminal 110 may be connected to the output end of the low-noise amplifier 11 and the output end of the low-noise amplifier 12.

The radio-frequency module 1 according to the embodiment may include no filter 44 and no switch 22. In this case, the other end of the inductor 30 and the other end of the inductor 32 may be connected to one end of the filter 42.

As described above, the receive path 10 and the receive path 20 are connected by the inductor 30, the receive path 10 is connected with the switch 23, which is a shunt switch, and the receive path 20 is connected with the switch 24, which is a shunt switch. The receive paths 10 and 20 are thus in a conducting state in a DC sense. When a radio-frequency signal is to be transmitted through the receive path 10 with the low-noise amplifier 11 placed in an ON state, the switch 24 can be placed in an ON state to set the receive paths 10 and 20 to ground in a DC sense. When a radio-frequency signal is to be transmitted through the receive path 20 with the low-noise amplifier 12 placed in an ON state, the switch 23 can be placed in an ON state to set the receive paths 10 and 20 to ground in a DC sense. That is, in transmitting a radio-frequency signal, the potential at the input end of each of the low-noise amplifiers 11 and 12 can be stabilized (pulled down). This makes it possible to shorten the period of instability in the transient response characteristics of output power that occurs upon switching action of the switch 21 and upon switching of operations of the low-noise amplifiers 11 and 12. Further, the impedance of the inductor 30 allows for improved radio-frequency isolation between the receive path 10 and the receive path 20. The configuration described above therefore makes it possible to shorten the period of instability in the transient response characteristics of the low-noise amplifiers 11 and 12, and improve isolation between the receive paths 10 and 20.

1.3. Conditions During Signal Transmission Through Radio-Frequency Module 1

Figure 2A:
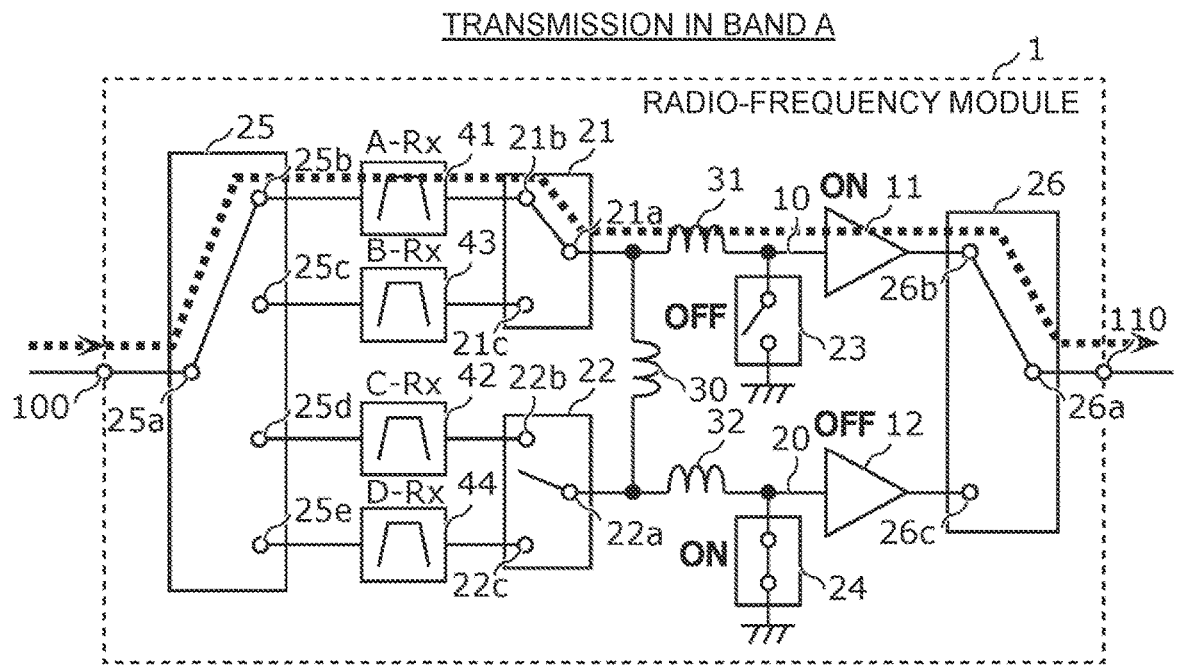
FIG. 2A illustrates a circuit condition when a signal of Band A is transmitted through the radio-frequency module according to the embodiment.

FIG. 2A illustrates a circuit condition when a signal of Band A is transmitted through the radio-frequency module according to the embodiment. When the radio-frequency module 1 is to transmit a receive signal of Band A, the low-noise amplifier 11 is placed in an ON state, the common terminal 25a and the selection terminal 25b are connected to each other, the common terminal 21a and the selection terminal 21b are connected to each other, the switch 23 is placed in a non-conducting state, and the switch 24 is placed in a conducting state. In this case, the receive signal of Band A passes through the following components: the antenna 2, the antenna connection terminal 100, the switch 25, the filter 41, the switch 21, the inductor 31, the low-noise amplifier 11, the switch 26, and the signal output terminal 110. According to the configuration mentioned above, a matching circuit connected to the input end of the low-noise amplifier 11 includes the inductor 31, which is disposed in series with the receive path 10, and the inductors 30 and 32, which are connected in series with each other between the receive path 10 and ground.

When the radio-frequency module 1 is to transmit a receive signal of Band B (not illustrated), the low-noise amplifier 11 is placed in an ON state, the common terminal 25a and the selection terminal 25c are connected to each other, the common terminal 21a and the selection terminal 21c are connected to each other, the switch 23 is placed in a non-conducting state, and the switch 24 is placed in a conducting state. In this case, the receive signal of Band B passes through the following components: the antenna 2, the antenna connection terminal 100, the switch 25, the filter 43, the switch 21, the inductor 31, the low-noise amplifier 11, the switch 26, and the signal output terminal 110. According to the configuration mentioned above, a matching circuit connected to the input end of the low-noise amplifier 11 includes the inductor 31, which is disposed in series with the receive path 10, and the inductors 30 and 32, which are connected in series with each other between the receive path 10 and ground.

Figure 2B:
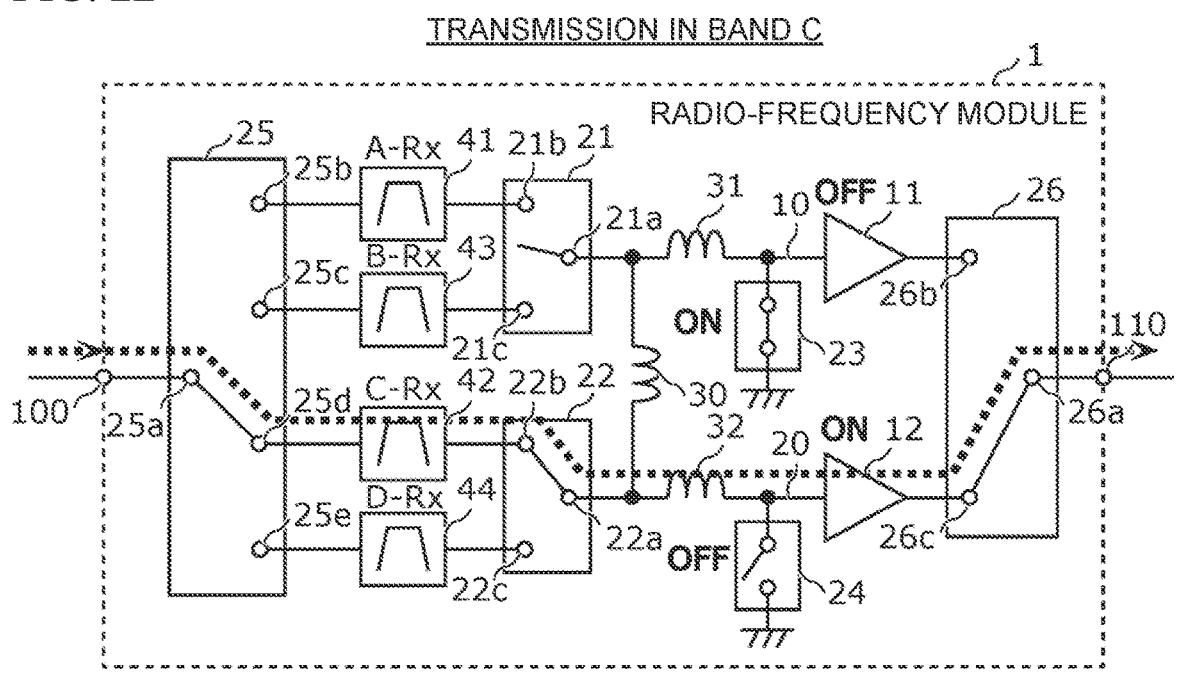
FIG. 2B illustrates a circuit condition when a signal of Band C is transmitted through the radio-frequency module according to the embodiment.

FIG. 2B illustrates a circuit condition when a signal of Band C is transmitted through the radio-frequency module according to the embodiment. When the radio-frequency module 1 is to transmit a receive signal of Band C, the low-noise amplifier 12 is placed in an ON state, the common terminal 25a and the selection terminal 25d are connected to each other, the common terminal 22a and the selection terminal 22b are connected to each other, the switch 24 is placed in a non-conducting state, and the switch 23 is placed in a conducting state. In this case, the receive signal of Band C passes through the following components: the antenna 2, the antenna connection terminal 100, the switch 25, the filter 42, the switch 22, the inductor 32, the low-noise amplifier 12, the switch 26, and the signal output terminal 110. According to the configuration mentioned above, a matching circuit connected to the input end of the low-noise amplifier 12 includes the inductor 32, which is disposed in series with the receive path 20, and the inductors 30 and 31, which are connected in series with each other between the receive path 20 and ground.

When the radio-frequency module 1 is to transmit a receive signal of Band D (not illustrated), the low-noise amplifier 12 is placed in an ON state, the common terminal 25a and the selection terminal 25e are connected to each other, the common terminal 22a and the selection terminal 22c are connected to each other, the switch 24 is placed in a non-conducting state, and the switch 23 is placed in a conducting state. In this case, the receive signal of Band D passes through the following components: the antenna 2, the antenna connection terminal 100, the switch 25, the filter 44, the switch 22, the inductor 32, the low-noise amplifier 12, the switch 26, and the signal output terminal 110. According to the configuration mentioned above, a matching circuit connected to the input end of the low-noise amplifier 12 includes the inductor 32, which is disposed in series with the receive path 20, and the inductors 30 and 31, which are connected in series with each other between the receive path 20 and ground.

According to the above-mentioned circuit behavior of the radio-frequency module 1, when the low-noise amplifier 11 is in operation and when the low-noise amplifier 12 is in operation, the inductor 30 can serve as a common matching element. This allows for reduced circuit size of the matching circuit.

Figure 3A:
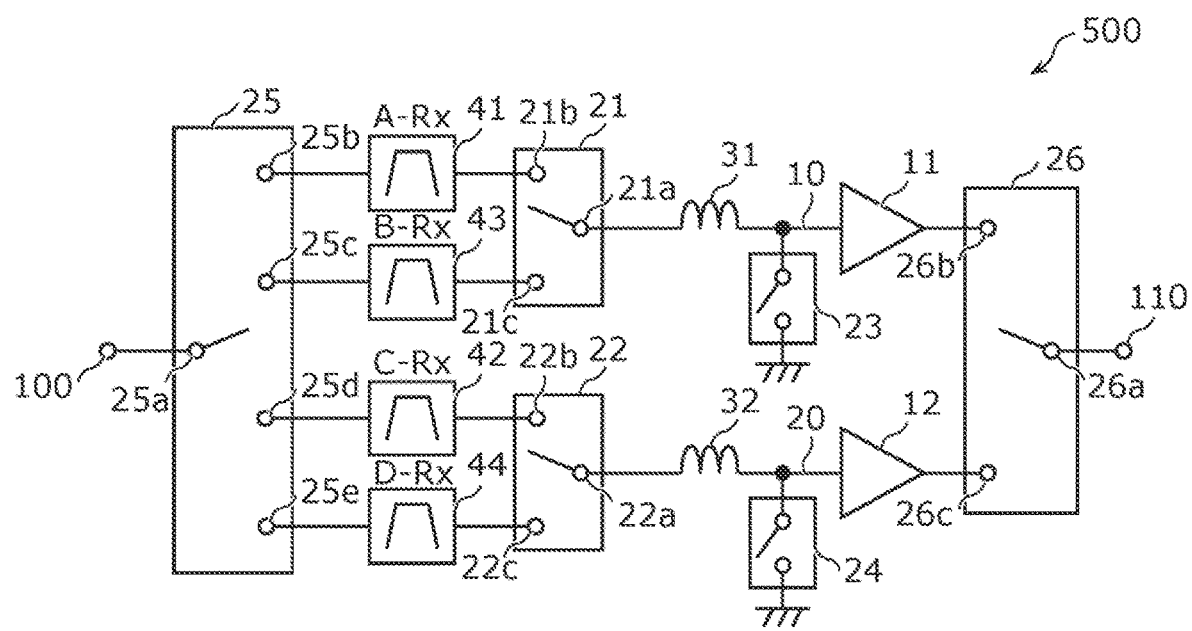
FIG. 3A is a circuit diagram of a radio-frequency module according to Comparative Example 1.

1.4. Comparison Between Characteristics of Radio-Frequency Module According to Embodiment and Characteristics of Radio-Frequency Module According to Comparative Example FIG. 3A is a circuit diagram of a radio-frequency module 500 according to Comparative Example 1. The radio-frequency module 500 according to Comparative Example 1 illustrated in FIG. 3A is an example of a radio-frequency module according to the related art. The radio-frequency module 500 includes the following components: the low-noise amplifiers 11 and 12, the filters 41, 42, 43, and 44, the switches 21, 22, 23, 24, 25, and 26, and the inductors 31 and 32. The radio-frequency module 500 according to Comparative Example 1 differs from the radio-frequency module 1 according to the embodiment only in that no inductor 30 is provided.

When the radio-frequency module 500 according to Comparative Example 1 is to transmit a receive signal of Band A, the low-noise amplifier 11 is placed in an ON state, the common terminal 25a and the selection terminal 25b are connected to each other, the common terminal 21a and the selection terminal 21b are connected to each other, and the switch 23 is placed in a non-conducting state. When the radio-frequency module 500 is to transmit a receive signal of Band B, the low-noise amplifier 11 is placed in an ON state, the common terminal 25a and the selection terminal 25c are connected to each other, the common terminal 21a and the selection terminal 21c are connected to each other, and the switch 23 is placed in a non-conducting state. When the radio-frequency module 500 is to transmit a receive signal of Band C, the low-noise amplifier 12 is placed in an ON state, the common terminal 25a and the selection terminal 25d are connected to each other, the common terminal 22a and the selection terminal 22b are connected to each other, and the switch 24 is placed in a non-conducting state. When the radio-frequency module 500 is to transmit a receive signal of Band D, the low-noise amplifier 12 is placed in an ON state, the common terminal 25a and the selection terminal 25e are connected to each other, the common terminal 22a and the selection terminal 22c are connected to each other, and the switch 24 is placed in a non-conducting state.

Figure 3B:
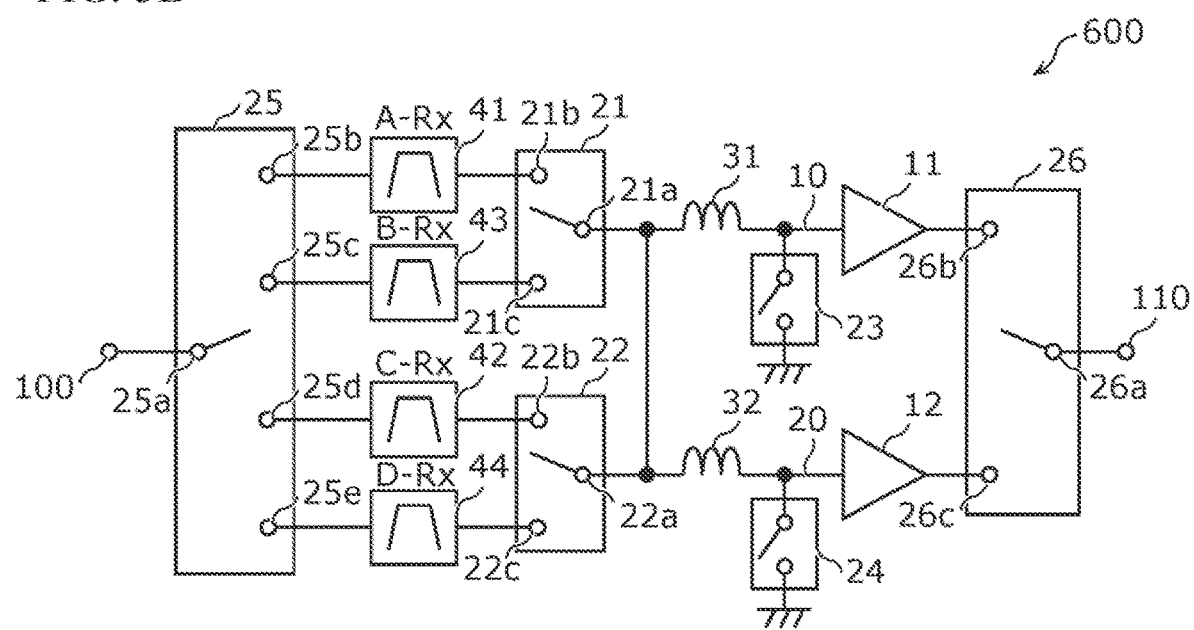
FIG. 3B is a circuit diagram of a radio-frequency module according to Comparative Example 2.

FIG. 3B is a circuit diagram of a radio-frequency module 600 according to Comparative Example 2. The radio-frequency module 600 according to Comparative Example 2 illustrated in FIG. 3B is an example of a radio-frequency module according to the related art. The radio-frequency module 600 includes the following components: the low-noise amplifiers 11 and 12, the filters 41, 42, 43, and 44, the switches 21, 22, 23, 24, 25, and 26, and the inductors 31 and 32. The radio-frequency module 600 according to Comparative Example 2 differs from the radio-frequency module 500 according to Comparative Example 1 only in that the receive path 10 and the receive path 20 are short-circuited.

When the radio-frequency module 600 according to Comparative Example 2 is to transmit a receive signal of Band A, the low-noise amplifier 11 is placed in an ON state, the common terminal 25a and the selection terminal 25b are connected to each other, the common terminal 21a and the selection terminal 21b are connected to each other, the switch 23 is placed in a non-conducting state, and the switch 24 is placed in a conducting state. When the radio-frequency module 600 is to transmit a receive signal of Band B, the low-noise amplifier 11 is placed in an ON state, the common terminal 25a and the selection terminal 25c are connected to each other, the common terminal 21a and the selection terminal 21c are connected to each other, the switch 23 is placed in a non-conducting state, and the switch 24 is placed in a conducting state. When the radio-frequency module 600 is to transmit a receive signal of Band C, the low-noise amplifier 12 is placed in an ON state, the common terminal 25a and the selection terminal 25d are connected to each other, the common terminal 22a and the selection terminal 22b are connected to each other, the switch 24 is placed in a non-conducting state, and the switch 23 is placed in a conducting state. When the radio-frequency module 600 is to transmit a receive signal of Band D, the low-noise amplifier 12 is placed in an ON state, the common terminal 25a and the selection terminal 25e are connected to each other, the common terminal 22a and the selection terminal 22c are connected to each other, the switch 24 is placed in a non-conducting state, and the switch 23 is placed in a conducting state.

Figure 4A:
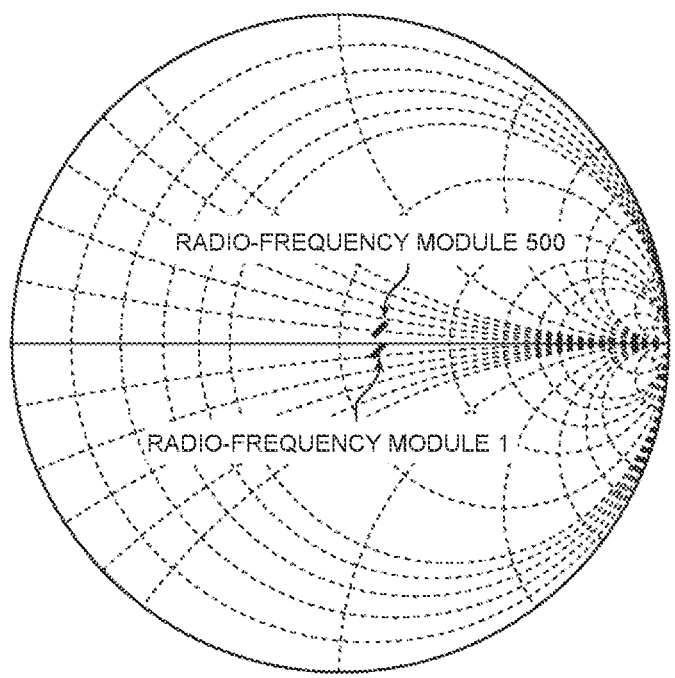
FIG. 4A is a Smith chart illustrating the input impedance of a low-noise amplifier of the radio-frequency module according to the embodiment, and the input impedance of a low-noise amplifier of the radio-frequency module according to Comparative Example 1.
Figure 4B:
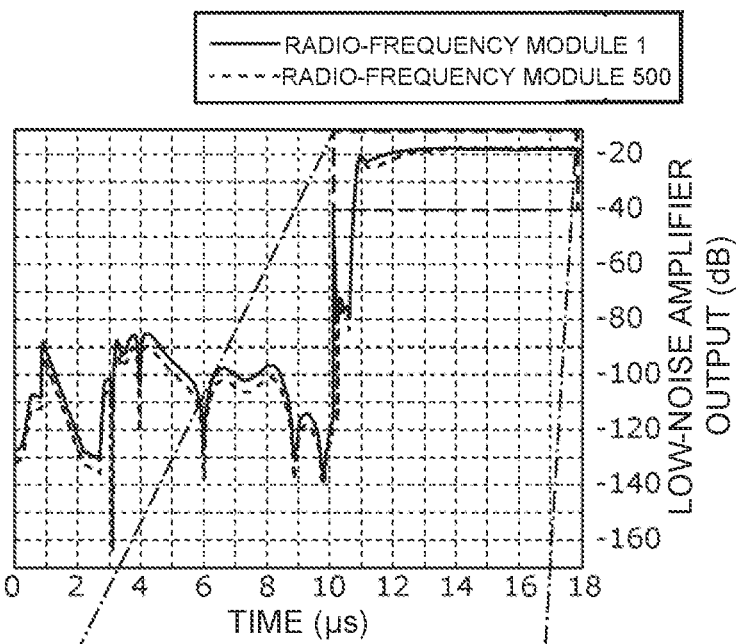
FIGS. 4BA and 4BB are graphs illustrating the transient response characteristics of the output of the radio-frequency module according to the embodiment, and the transient response characteristics of the output of the radio-frequency module according to Comparative Example 1.
Figure 4B:
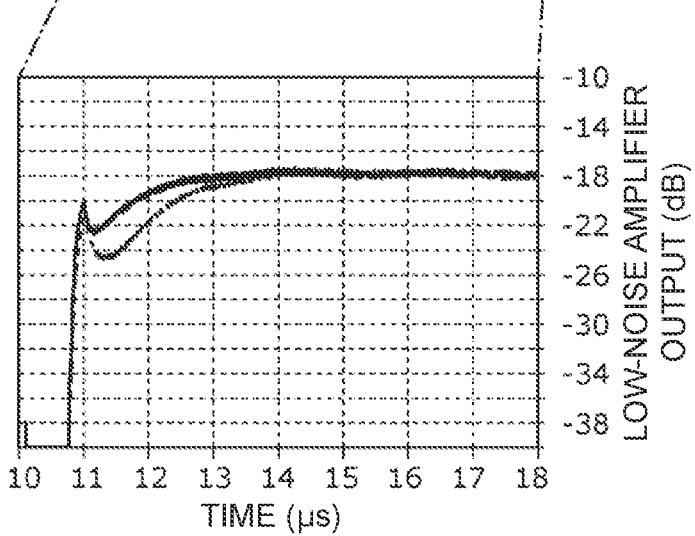

FIG. 4A is a Smith chart illustrating the input impedance of a low-noise amplifier of the radio-frequency module according to the embodiment, and the input impedance of a low-noise amplifier of the radio-frequency module according to Comparative Example 1. FIGS. 4BA and 4BB are graphs illustrating the transient response characteristics of the output of the radio-frequency module according to the embodiment, and the transient response characteristics of the output of the radio-frequency module according to Comparative Example 1.

FIG. 4A illustrates the impedance seen from one end of the filter 41 or 42 toward the low-noise amplifier 11 in the radio-frequency module 1 according to the embodiment (the input impedance of the low-noise amplifier 11 according to the embodiment), and the impedance seen from one end of the filter 41 or 42 toward the low-noise amplifier 11 in the radio-frequency module 500 according to Comparative Example 1 (the input impedance of the low-noise amplifier 11 according to Comparative Example 1). Through adjustment of the respective inductance values of the inductors 31 and 32, the low-noise amplifier 11 according to the embodiment, and the low-noise amplifier 11 according to Comparative Example 1 have substantially the same input impedance value as illustrated in FIG. 4A. Although not illustrated, the low-noise amplifier 12 according to the embodiment, and the low-noise amplifier 12 according to Comparative Example 1 likewise have substantially the same impedance value.

The radio-frequency module according to the embodiment, and the radio-frequency module according to Comparative Example 1, however, differ from each other in the respective output transient response characteristics of the low-noise amplifiers 11 and 12. FIGS. 4BA and 4BB illustrate the output characteristics of the low-noise amplifier 11 when the low-noise amplifier 11 undergoes a step change from an OFF state to an ON state at time 10 µs.

When the radio-frequency module 500 according to Comparative Example 1 is to transmit a receive signal of Band A or Band B with the low-noise amplifier 11 placed in an ON state, the switch 23 is in a non-conducting state. Accordingly, the potential of the receive path 10, which links the switch 21 and the input end of the low-noise amplifier 11 to each other, is not at ground and is unstable in a DC sense. This means that as illustrated in FIG. 4BB, at the instant of OFF to ON transition of the low-noise amplifier 11 (at time 10 µs), the output transient response characteristics of the low-noise amplifier 11 are such that it takes a long period of time (period of instability) for output power to settle to a steady-state value.

By contrast, in the radio-frequency module 1 according to the embodiment, when a radio-frequency signal is to be transmitted through the receive path 10 with the low-noise amplifier 11 placed in an ON state, the switch 24 can be placed in an ON state to set the receive paths 10 and 20 to ground in a DC sense. When a radio-frequency signal is to be transmitted through the receive path 20 with the low-noise amplifier 12 placed in an ON state, the switch 23 can be placed in an ON state to set the receive paths 20 and 10 to ground in a DC sense. That is, in transmitting a radio-frequency signal, the potential at the input end of each of the low-noise amplifiers 11 and 12 can be stabilized (pulled down). As illustrated in part FIG. 4BB, this makes it possible to shorten the period of instability in the transient response characteristics of output power that occurs upon switching of operations of the low-noise amplifiers 11 and 12.

One exemplary configuration to shorten the period of instability in the transient response characteristics of the low-noise amplifiers 11 and 12 is the configuration of the radio-frequency module 600 according to Comparative Example 2. In the radio-frequency module 600 according to Comparative Example 2, the receive path 10 and the receive path 20 are short-circuited. Consequently, when a radio-frequency signal is to be transmitted through the receive path 10 with the low-noise amplifier 11 placed in an ON state, the switch 24 can be placed in an ON state to set the receive paths 10 and 20 to ground in a DC sense. When a radio-frequency signal is to be transmitted through the receive path 20 with the low-noise amplifier 12 placed in an ON state, the switch 23 can be placed in an ON state to set the receive paths 20 and 10 to ground in a DC sense. However, due to the receive path 10 and the receive path 20 being connected by a short-circuit line, in transmitting a receive signal of Band A or Band B through the receive path 10, the receive signal of Band A or Band B may leak to the receive path 20. Likewise, in transmitting a receive signal of Band C or Band D through the receive path 20, the receive signal of Band C or Band D may leak to the receive path 10. Further, in transmitting a receive signal of Band A through the receive path 10, due to the short-circuit line connecting the receive paths 10 and 20, not only the off-state capacitance between the common terminal 21a and the selection terminal 21b, but also the off-state capacitance between the common terminal 22a and the selection terminal 22b and the off-state capacitance between the common terminal 22a and the selection terminal 22c are added in parallel to the common terminal 21a disposed in the receive path 10. This results in problems such as increased off-state capacitance of the common terminal 21a, and increased transmission loss of the switch 21.

By contrast, in the radio-frequency module 1 according to the embodiment, the receive paths 10 and 20 are connected by the inductor 30. Accordingly, setting the receive paths 10 and 20 to the ground potential in a DC sense makes it possible to shorten the period of instability in the transient response characteristics of output power that occurs upon switching of operations of the low-noise amplifiers 11 and 12. Further, the impedance defined by the impedance value of the inductor 30 ensures radio-frequency isolation between the receive path 10 and the receive path 20.

The above-mentioned configuration therefore makes it possible to reduce deterioration of the transient response characteristics of the amplifier output while providing improved isolation between the low-noise amplifiers 11 and 12.

In a desirable configuration of the radio-frequency module 1 according to the embodiment, the inductor 30 has an inductance value greater than the inductance value of the inductor 31 and greater than the inductance value of the inductor 32.

The above-mentioned configuration allows the inductor 30 to have a comparatively large inductance value. This allows the inductor 30 to have a comparatively large radio-frequency impedance, leading to improved isolation between the receive path 10 and the receive path 20. The above-mentioned configuration makes it possible to enhance the ground potential of each of the receive paths 10 and 20 in a DC sense.

In a desirable configuration of the radio-frequency module 1 according to the embodiment, as illustrated in FIG. 1, the switch 23 is connected between ground, and a portion of the receive path 10 that links the inductor 31 and the input end of the low-noise amplifier 11 to each other, and the switch 24 is connected between ground, and a portion of the receive path 20 that links the inductor 32 and the input end of the low-noise amplifier 12 to each other.

According to the above-mentioned configuration, the switches 23 and 24, which are connected to ground, are connected in the immediate vicinity of the low-noise amplifiers 11 and 12, respectively. The input end of each of the low-noise amplifiers 11 and 12 can be thus set to the ground potential in a more stable fashion in a DC sense. The above-mentioned configuration therefore makes it possible to improve the noise figure or other characteristics of the low-noise amplifiers 11 and 12.

Figure 5A:
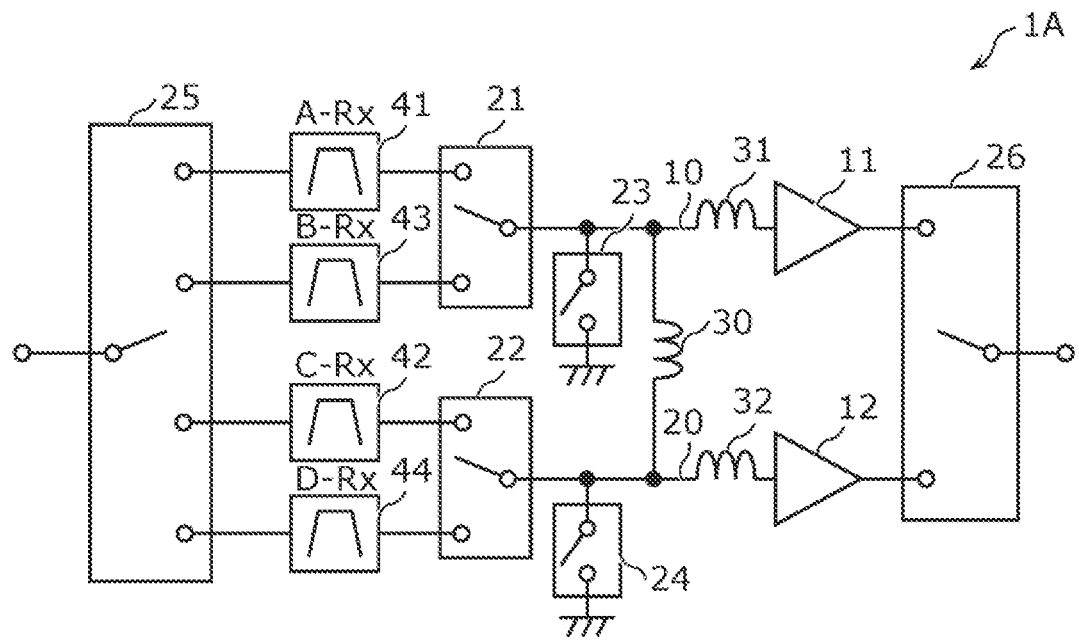
FIG. 5A is a circuit diagram of a radio-frequency module according to Modification 1.

1.5. Circuit Configurations of Radio-Frequency Modules According to Modifications FIG. 5A is a circuit diagram of a radio-frequency module 1A according to Comparative Example 1. As illustrated in FIG. 5A, the radio-frequency module 1A includes the following components: the low-noise amplifiers 11 and 12, the filters 41, 42, 43, and 44, the switches 21, 22, 23, 24, 25, and 26, the inductors 30, 31, and 32, the antenna connection terminal 100, and the signal output terminal 110. The radio-frequency module 1A according to Modification 1 differs from the radio-frequency module 1 according to the embodiment in where the switches 23 and 24 are connected. In the following description of the radio-frequency module 1A according to Modification 1, its features different from those of the radio-frequency module 1 according to the embodiment are mainly described, and features identical to those of the radio-frequency module 1 are not be described in further detail.

The switch 23 is an example of a second switch. The switch 23 is connected between ground, and a portion of the receive path 10 that links the common terminal 21a and the inductor 31 to each other. The switch 24 is an example of a third switch. The switch 24 is connected between ground, and a portion of the receive path 20 that links the common terminal 22a and the inductor 32 to each other.

When the radio-frequency module 1A is to transmit a receive signal of Band A or Band B, a matching circuit connected to the input end of the low-noise amplifier 11 includes the inductor 31, which is disposed in series with the receive path 10, and the inductor 30, which is connected between the receive path 10 and ground.

When the radio-frequency module 1A is to transmit a receive signal of Band C or Band D, a matching circuit connected to the input end of the low-noise amplifier 12 includes the inductor 32, which is disposed in series with the receive path 20, and the inductor 30, which is connected between the receive path 20 and ground.

The configuration mentioned above makes it possible to shorten the period of instability in the transient response characteristics of the low-noise amplifiers 11 and 12, and improve isolation between the receive paths 10 and 20.

Figure 5B:
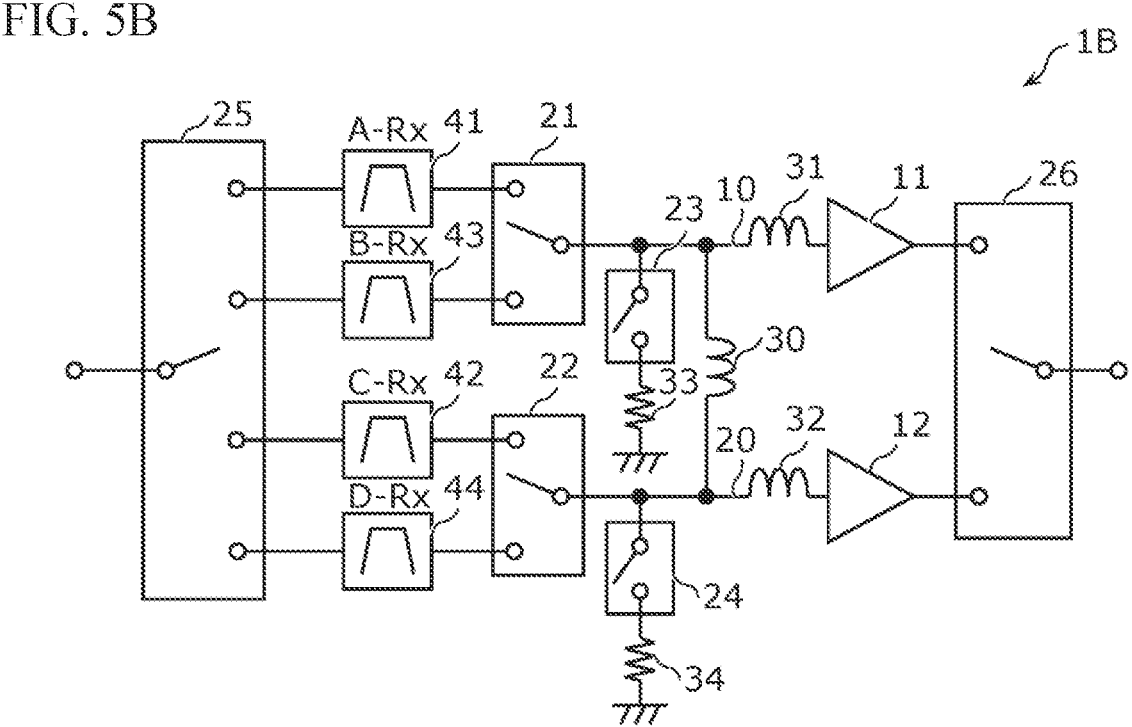
FIG. 5B is a circuit diagram of a radio-frequency module according to Modification 2.

FIG. 5B is a circuit diagram of a radio-frequency module 1B according to Modification 2. As illustrated in FIG. 5B, the radio-frequency module 1B includes the following components: the low-noise amplifiers 11 and 12, the filters 41, 42, 43, and 44, the switches 21, 22, 23, 24, 25, and 26, the inductors 30, 31, and 32, resistors 33 and 34, the antenna connection terminal 100, and the signal output terminal 110. The radio-frequency module 1B according to Modification 2 differs from the radio-frequency module 1A according to Modification 1 in that the resistors 33 and 34 are additionally provided. In the following description of the radio-frequency module 1B according to Modification 2, its features different from those of the radio-frequency module 1A according to Modification 1 are mainly described, and features identical to those of the radio-frequency module 1A are not described in further detail.

The resistor 33 is an example of a first resistor. The resistor 33 is disposed between the receive path 10 and ground. The resistor 33 is connected in series with the switch 23. The resistor 34 is an example of a second resistor. The resistor 34 is disposed between the receive path 20 and ground. The resistor 34 is connected in series with the switch 24.

Each of the resistors 33 and 34 may be a surface-mount resistive element, or may be a wiring resistor.

The configuration mentioned above makes it possible to shorten the period of instability in the transient response characteristics of the low-noise amplifiers 11 and 12, and improve isolation between the receive paths 10 and 20.

Figure 5C:
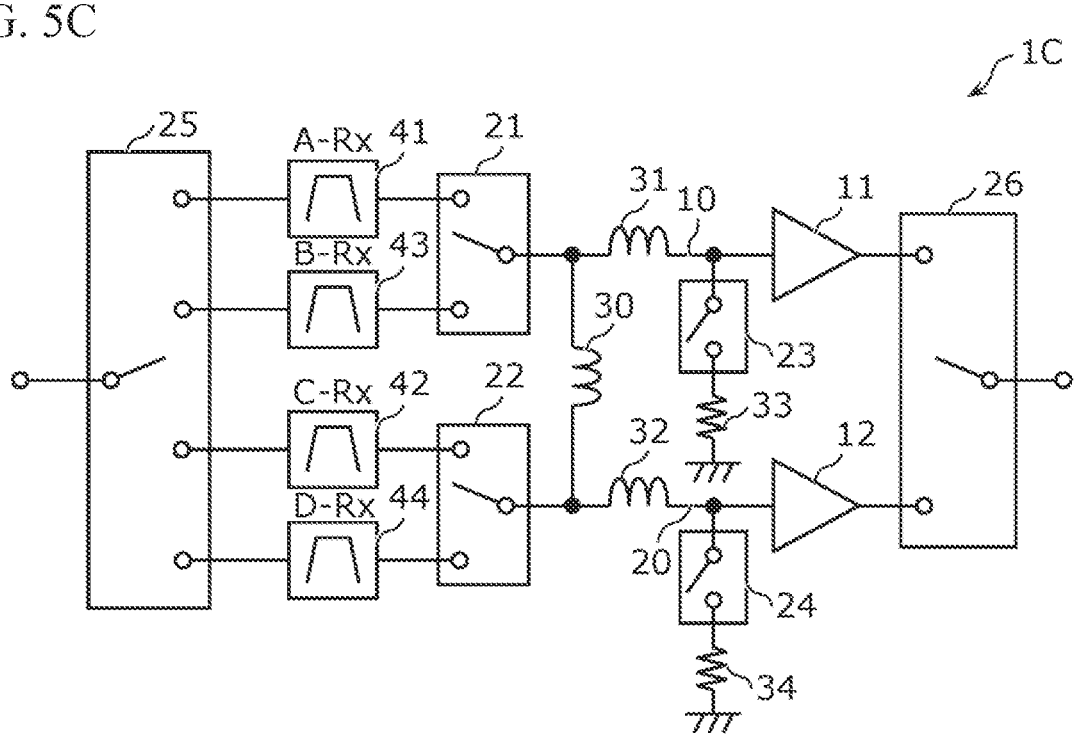
FIG. 5C is a circuit diagram of a radio-frequency module according to Modification 3.

FIG. 5C is a circuit diagram of a radio-frequency module 1C according to Modification 3. As illustrated in FIG. 5C, the radio-frequency module 1C includes the following components: the low-noise amplifiers 11 and 12, the filters 41, 42, 43, and 44, the switches 21, 22, 23, 24, 25, and 26, the inductors 30, 31, and 32, the resistors 33 and 34, the antenna connection terminal 100, and the signal output terminal 110. The radio-frequency module 1C according to Modification 3 differs from the radio-frequency module 1 according to the embodiment in that the resistors 33 and 34 are additionally provided. In the following description of the radio-frequency module 1C according to Modification 3, its features different from those of the radio-frequency module 1 according to the embodiment are mainly described, and features identical to those of the radio-frequency module 1 are not described in further detail.

The resistor 33 is an example of a first resistor. The resistor 33 is disposed between the receive path 10 and ground. The resistor 33 is connected in series with the switch 23. The resistor 34 is an example of a second resistor. The resistor 34 is disposed between the receive path 20 and ground. The resistor 34 is connected in series with the switch 24.

Each of the resistors 33 and 34 may be a surface-mount resistive element, or may be a wiring resistor.

The configuration mentioned above makes it possible to shorten the period of instability in the transient response characteristics of the low-noise amplifiers 11 and 12, and improve isolation between the receive paths 10 and 20.

1.6. Configuration of Radio-Frequency Module 1

The configuration of the components of the radio-frequency module 1 according to the embodiment is described below with reference to FIGS. 6A and 6B.

Figure 6A:
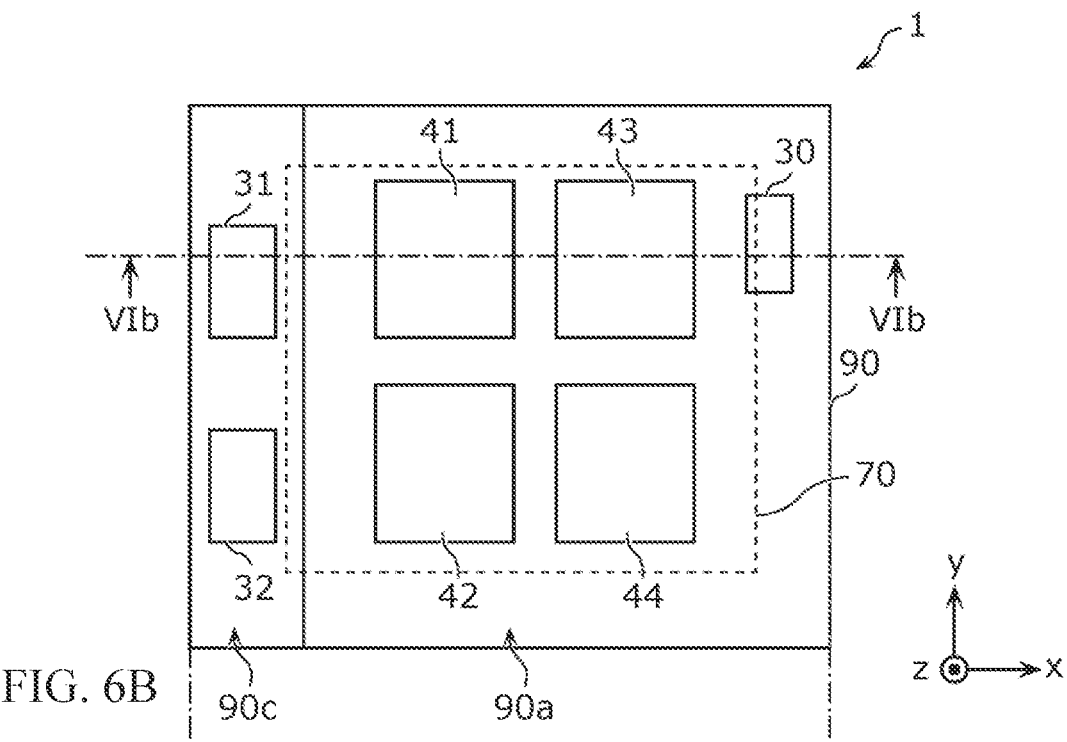
FIG. 6A illustrates plan view and FIG. 6B illustrates cross-sectional view of the radio-frequency module according to the embodiment.
Figure 6B:
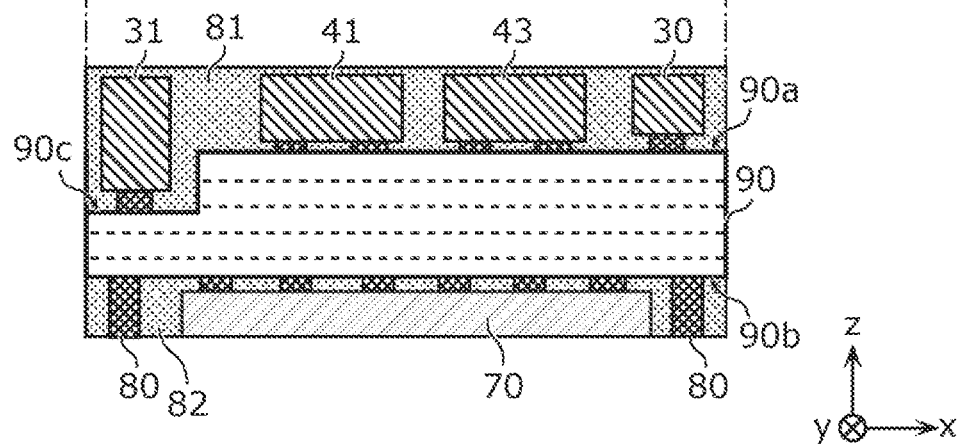

FIG. 6A illustrates plan view and FIG. 6B illustrates cross-sectional view of the radio-frequency module 1 according to the embodiment. FIG. 6A is a plan view of the radio-frequency module 1, with a major face of a module substrate 90 viewed in perspective from the positive side of the z-axis. FIG. 6B is a cross-sectional view of the radio-frequency module 1. The cross-section of the radio-frequency module 1 in FIG. 6B is taken along a line VIb-VIb in FIG. 6A. In FIGS. 6A and 6B, wiring lines connecting the module substrate 90 and individual circuit components are not depicted.

As illustrated in FIGS. 6A and 6B, the radio-frequency module 1 further includes the following components in addition to the circuit components illustrated in FIG. 1: the module substrate 90, resin components 81 and 82, and an external connection terminal 80.

The module substrate 90 includes a major face 90a (first major face), a major face 90b (second major face), and a major face 90c (third major face). Circuit components of the radio-frequency module 1 are mounted at the module substrate 90. The major face 90a and the major face 90b are opposite to each other. The major face 90c and the major face 90b are opposite to each other. The distance between the major face 90a and the major face 90b is greater than the distance between the major face 90c and the major face 90b.

Non-limiting examples of the module substrate 90 include the following substrates with a multilayer structure of multiple dielectric layers; low temperature co-fired ceramic (LTCC) substrates; high temperature co-fired ceramic (HTCC) substrates; substrates with embedded components; substrates with a redistribution layer (RDL); and printed circuit boards.

The resin component 81 is disposed at the major faces 90a and 90c of the module substrate 90. The resin component 81 covers at least part of circuit components constituting the radio-frequency module 1, and the major faces 90a and 90c. The resin component 81 serves to ensure the reliability of the above-mentioned circuit components, such as mechanical strength and moisture resistance. The resin component 82 is disposed at the major face 90b of the module substrate 90. The resin component 82 covers at least the side of a semiconductor IC 70, and the major face 90b. The resin component 82 serves to ensure the reliability of the semiconductor IC 70, such as mechanical strength and moisture resistance. The resin components 81 and 82 are optional rather than required components of the radio-frequency module according to the present disclosure.

The radio-frequency module 1 illustrated in FIGS. 6A and 6B may further include a shield electrode layer that covers at least part of the resin component 81, the module substrate 90, and the resin component 82.

As illustrated in FIGS. 6A and 6B, in the radio-frequency module 1, the filters 41, 42, 43, and 44, and the inductor 30 are disposed at the major face 90a. The inductors 31 and 32 are disposed at the major face 90c. The semiconductor IC 70 and the external connection terminal 80 are disposed at the major face 90b.

The low-noise amplifiers 11 and 12, and the switches 21, 22, 23, 24, 25, and 26 are included in the semiconductor IC 70. The switch 26 does not have to be included in the semiconductor IC 70. The low-noise amplifiers 11 and 12 may be included in a semiconductor IC different from the semiconductor IC 70.

The semiconductor IC 70 is implemented by use of, for example, a complementary metal oxide semiconductor (CMOS) process. Specifically, the semiconductor IC 70 may be fabricated by a silicon-on-insulator (SOI) process. The semiconductor IC 70 is not limited to a CMOS semiconductor IC.

As described above, circuit components constituting the radio-frequency module 1 are disposed at the major face 90a, the major face 90c, and the major face 90b in a distributed fashion. This allows for miniaturization of the radio-frequency module 1. The amplifiers and the switches are implemented in the semiconductor IC. This likewise allows for miniaturization of the radio-frequency module 1.

The inductors 31 and 32 are respectively disposed in series with the receive paths 10 and 20 through which radio-frequency signals propagate. Accordingly, to achieve low-loss transmissions, the inductors 31 and 32 are required to be high Q-factor inductors. The inductor 30, by contrast, is disposed in a shunt path. As such, the inductor 30 is not required to have a high Q factor in comparison to the inductors 31 and 32. From this perspective, the inductors 31 and 32, which have a comparatively large size to ensure high Q factor, are disposed at the major face 90c, and the inductor 30, which may need to have only a small size, is disposed at the major face 90a. This makes it possible to align the heights of the inductors 30, 31, and 32, and consequently reduce the profile of the radio-frequency module 1.

The radio-frequency module 1 illustrated in FIGS. 6A and 6B may further include a shield electrode layer that covers at least part of the resin component 81, the module substrate 90, and the resin component 82.

2. Effects Etc.

As described above, the radio-frequency module 1 according to the embodiment includes the low-noise amplifiers 11 and 12, the switch 21, the filter 41, the filter 43, the filter 42, the inductor 31, the inductor 32, the switch 23, the switch 24, and the inductor 30. The switch 21 includes the common terminal 21a, and the selection terminals 21b and 21c. The filter 41 is connected to the selection terminal 21b. The filter 43 is connected to the selection terminal 21c. The inductor 31 is connected between the common terminal 21a, and the input end of the low-noise amplifier 11. The inductor 32 is connected between the filter 42, and the input end of the low-noise amplifier 12. The switch 23 is connected between the receive path 10 and ground. The receive path 10 links the common terminal 21a and the input end of the low-noise amplifier 11 to each other. The switch 24 is connected between the receive path 20 and ground. The receive path 20 links the filter 42 and the input end of the low-noise amplifier 12 to each other. The inductor 30 is connected between the receive path 10 and the receive path 20.

According to the configuration mentioned above, as the switch 23 or 24 becomes conducting, the receive paths 10 and 20 become conducting in a DC sense. That is, in transmitting a radio-frequency signal, the potential at the input end of each of the low-noise amplifiers 11 and 12 can be stabilized (pulled down). This makes it possible to shorten the period of instability in the transient response characteristics of output power that occurs upon switching action of the switch 21 and upon switching of operations of the low-noise amplifiers 11 and 12. Further, the impedance of the inductor 30 allows for improved radio-frequency isolation between the receive path 10 and the receive path 20. The above-mentioned configuration therefore makes it possible to reduce deterioration of the transient response characteristics of the low-noise amplifiers 11 and 12. The above-mentioned configuration further makes it possible to improve isolation between the receive paths 10 and 20.

In one exemplary configuration, in the radio-frequency module 1, when the low-noise amplifier 11 is in an ON state, the common terminal 21a and one of the selection terminals 21b and 21c are connected to each other, the switch 23 is in a non-conducting state, and the switch 24 is in a conducting state. When the low-noise amplifier 12 is in an ON state, the switch 24 is in a non-conducting state, and the switch 23 is in a conducting state.

According to the configuration mentioned above, in transmitting a radio-frequency signal, the potential at the input end of each of the low-noise amplifiers 11 and 12 can be stabilized (pulled down). This makes it possible to shorten the period of instability in the transient response characteristics of output power that occurs upon switching action of the switch 21 and upon switching of operations of the low-noise amplifiers 11 and 12.

In one exemplary configuration, the radio-frequency module 1 further includes the switch 22 and the filter 44. The switch 22 includes the common terminal 22a, and the selection terminals 22b and 22c. The filter 44 is connected to the selection terminal 22c. The receive path 20 links the common terminal 22a and the low-noise amplifier 12 to each other. The filter 42 is connected to the selection terminal 22b. The inductor 32 is connected between the common terminal 22a, and the input end of the low-noise amplifier 12.

According to the configuration mentioned above, as the switch 23 or 24 becomes conducting, the receive paths 10 and 20 become conducting in a DC sense. That is, in transmitting a radio-frequency signal, the potential at the input end of each of the low-noise amplifiers 11 and 12 can be stabilized (pulled down). This makes it possible to shorten the period of instability in the transient response characteristics of output power that occurs upon switching actions of the switches 21 and 22 and upon switching of operations of the low-noise amplifiers 11 and 12.

In one exemplary configuration, in the radio-frequency module 1, when the low-noise amplifier 11 is in an ON state, the common terminal 21a and one of the selection terminals 21b and 21c are connected to each other, the switch 23 is in a non-conducting state, and the switch 24 is in a conducting state. When the low-noise amplifier 12 is in an ON state, the common terminal 22a and one of the selection terminals 22b and 22c are connected to each other, the switch 24 is in a non-conducting state, and the switch 23 is in a conducting state.

According to the configuration mentioned above, in transmitting a radio-frequency signal, the potential at the input end of each of the low-noise amplifiers 11 and 12 can be stabilized (pulled down). This makes it possible to shorten the period of instability in the transient response characteristics of output power that occurs upon switching actions of the switches 21 and 22 and upon switching of operations of the low-noise amplifiers 11 and 12.

In one exemplary configuration, in the radio-frequency module 1, the inductor 30 has an inductance value greater than the inductance value of the inductor 31 and greater than the inductance value of the inductor 32.

The above-mentioned configuration allows the inductor 30 to have a comparatively large inductance value. This allows the inductor 30 to have a comparatively large radio-frequency impedance, leading to improved isolation between the receive path 10 and the receive path 20. The above-mentioned configuration also makes it possible to enhance the ground potential of each of the receive paths 10 and 20 in a DC sense.

In one exemplary configuration, in the radio-frequency module 1, the switch 23 is connected between ground, and a portion of the receive path 10 that links the inductor 31 and the input end of the low-noise amplifier 11 to each other, and the switch 24 is connected between ground, and a portion of the receive path 20 that links the inductor 32 and the input end of the low-noise amplifier 12 to each other.

According to the above-mentioned configuration, the switches 23 and 24, which are connected to ground, are connected in the immediate vicinity of the low-noise amplifiers 11 and 12, respectively. The input end of each of the low-noise amplifiers 11 and 12 can be thus set to the ground potential in a more stable fashion in a DC sense. The above-mentioned configuration therefore makes it possible to improve the noise figure or other characteristics of the low-noise amplifiers 11 and 12.

In one exemplary configuration, in each of the radio-frequency modules 1A and 1B, the switch 23 is connected between ground, and a portion of the receive path 10 that links the common terminal 21a and the inductor 31 to each other, and the switch 24 is connected between ground, and a portion of the receive path 20 that links the filter 42 and the inductor 32 to each other.

The configuration mentioned above makes it possible to shorten the period of instability in the transient response characteristics of the low-noise amplifiers 11 and 12, and improve isolation between the receive paths 10 and 20.

In one exemplary configuration, each of the radio-frequency modules 1B and 1C further includes the resistor 33 and the resistor 34. The resistor 33 is disposed between the receive path 10 and ground. The resistor 33 is connected in series with the switch 23. The resistor 34 is disposed between the receive path 20 and ground. The resistor 34 is connected in series with the switch 24.

The configuration mentioned above makes it possible to shorten the period of instability in the transient response characteristics of the low-noise amplifiers 11 and 12, and improve isolation between the receive paths 10 and 20.

In one exemplary configuration, the radio-frequency module 1 further includes the module substrate 90. The module substrate 90 includes the major faces 90a, 90b, and 90c. The major face 90a and the major face 90b are opposite to each other. The major face 90c and the major face 90b are opposite to each other. The distance between the major face 90a and the major face 90b is greater than the distance between the major face 90c and the major face 90b. The inductors 31 and 32 are disposed at the major face 90c. The inductor 30 is disposed at the major face 90a.

According to the configuration mentioned above, the inductors 31 and 32, which have a comparatively large size to ensure high Q factor, are disposed at the major face 90c, and the inductor 30, which may need to have only a small size, is disposed at the major face 90a. This makes it possible to align the heights of the inductors 30, 31, and 32, and consequently reduce the profile of the radio-frequency module 1.

In one exemplary configuration, in the radio-frequency module 1, the filters 41 to 43 are disposed at the major face 90a. The low-noise amplifiers 11 and 12, and the switches 21, 23, and 24 are disposed at the major face 90b.

According to the configuration mentioned above, circuit components constituting the radio-frequency module 1 are disposed at the major face 90a, the major face 90c, and the major face 90b in a distributed fashion. This allows for miniaturization of the radio-frequency module 1.

In one exemplary configuration, in the radio-frequency module 1, the low-noise amplifiers 11 and 12, and the switches 21, 23, and 24 are included in the semiconductor IC 70 disposed at the major face 90b.

According to the configuration mentioned above, the amplifiers and the switches are implemented in the semiconductor IC 70. This allows for miniaturization of the radio-frequency module 1.

The communication apparatus 4 according to the embodiment includes the RFIC 3, and the radio-frequency module 1. The RFIC 3 processes a radio-frequency signal. The radio-frequency module 1 transmits the radio-frequency signal between the RFIC 3 and the antenna 2.

The configuration mentioned above allows the effects of the radio-frequency module 1 to be implemented by the communication apparatus 4.

OTHER EMBODIMENTS

Although the radio-frequency module and the communication apparatus according to the embodiment have been described above by way of the embodiment and its modifications, the radio-frequency module and the communication apparatus according to the present disclosure are not limited to the embodiment and the modifications described above. The present disclosure is intended to also encompass: other embodiments implemented by combining any components in the embodiment and the modifications described above; modifications obtained by modifying the embodiment and the modifications described above in various ways as may become apparent to one skilled in the art without necessarily departing from the scope of the present disclosure; and various kinds of equipment incorporating the radio-frequency module and the communication apparatus described above.

For example, in the radio-frequency module and the communication apparatus according to the embodiment and the modifications described above, other circuit elements, wiring, and other features may be inserted between paths that connect the circuit elements and the signal paths that are illustrated in the drawings.

Characteristic features of the radio-frequency module and the communication apparatus described above with reference to the embodiment and the modifications described above are presented below.

<1>
A radio-frequency module including:
a first amplifier;
a second amplifier;
a first switch including a first common terminal, a first selection terminal, and a second selection terminal;
a first filter connected to the first selection terminal;
a second filter connected to the second selection terminal;
a third filter;
a first inductor connected between the first common terminal and an input end of the first amplifier;
a second inductor connected between the third filter and an input end of the second amplifier;
a second switch connected between a first path and ground, the first path linking the first common terminal and the input end of the first amplifier to each other;
a third switch connected between a second path and ground, the second path linking the third filter and the input end of the second amplifier to each other; and
a third inductor connected between the first path and the second path.

<2>
The radio-frequency module according to Item <1>,
in which when the first amplifier is in an ON state, the first common terminal and one of the first selection terminal and the second selection terminal are connected to each other, the second switch is in a non-conducting state, and the third switch is in a conducting state, and
in which when the second amplifier is in an ON state, the third switch is in a non-conducting state, and the second switch is in a conducting state.

<3>
The radio-frequency module according to Item <1>, further including:
a fourth switch including a second common terminal, a third selection terminal, and a fourth selection terminal; and
a fourth filter connected to the fourth selection terminal,
in which the second path links the second common terminal and the input end of the second amplifier to each other,
in which the third filter is connected to the third selection terminal, and
in which the second inductor is connected between the second common terminal and the input end of the second amplifier.

<4>
The radio-frequency module according to Item <3>,
in which when the first amplifier is in an ON state, the first common terminal and one of the first selection terminal and the second selection terminal are connected to each other, the second switch is in a non-conducting state, and the third switch is in a conducting state, and
in which when the second amplifier is in an ON state, the second common terminal and one of the third selection terminal and the fourth selection terminal are connected to each other, the third switch is in a non-conducting state, and the second switch is in a conducting state.

<5>
The radio-frequency module according to any one of Items <1> to <4>,
in which the third inductor has an inductance value greater than an inductance value of the first inductor and greater than an inductance value of the second inductor.

<6>
The radio-frequency module according to any one of Items <1> to <5>,
in which the second switch is connected between a portion of the first path and ground, the portion of the first path linking the first inductor and the input end of the first amplifier to each other, and
in which the third switch is connected between a portion of the second path and ground, the portion of the second path linking the second inductor and the input end of the second amplifier to each other.

<7>
The radio-frequency module according to any one of Items <1> to <5>,
in which the second switch is connected between a portion of the first path and ground, the portion of the first path linking the first common terminal and the first inductor to each other, and in which the third switch is connected between a portion of the second path and ground, the portion of the second path linking the third filter and the second inductor to each other.

<8>
The radio-frequency module according to any one of Items <1> to <7>, further including:
a first resistor disposed between the first path and ground, the first resistor being connected in series with the second switch; and
a second resistor disposed between the second path and ground, the second resistor being connected in series with the third switch.

<9>
The radio-frequency module according to any one of Items <1> to <8>, further including
a module substrate including a first major face, a second major face, and a third major face,
in which the first major face and the second major face are opposite to each other,
in which the third major face and the second major face are opposite to each other,
in which a distance between the first major face and the second major face is greater than a distance between the third major face and the second major face,
in which the first inductor and the second inductor are disposed at the third major face, and
in which the third inductor is disposed at the first major face.

<10>
The radio-frequency module according to Item <9>,
in which the first filter, the second filter, and the third filter are disposed at the first major face, and
in which the first amplifier, the second amplifier, the first switch, the second switch, and the third switch are disposed at the second major face.

<11>
The radio-frequency module according to Item <10>,
in which the first amplifier, the second amplifier, the first switch, the second switch, and the third switch are included in a semiconductor IC disposed at the second major face.

<12>
A communication apparatus including:
a signal processing circuit that processes a radio-frequency signal; and
the radio-frequency module according to any one of Items <1> to <11> that transmits the radio-frequency signal between the signal processing circuit and an antenna.

The present disclosure can be used as, for example, a multiband/multimode-compatible front-end circuit for a wide variety of communication apparatuses such as mobile phones.

What is claimed is:
1. A radio-frequency module comprising:
a first amplifier;
a second amplifier;
a first switch having a first common terminal, a first selection terminal, and a second selection terminal;
a first filter connected to the first selection terminal;
a second filter connected to the second selection terminal;
a third filter;
a first inductor connected between the first common terminal and an input of the first amplifier;
a second inductor connected between the third filter and an input of the second amplifier;
a second switch connected between a first path and ground, the first path connecting the first common terminal to the input of the first amplifier;
a third switch connected between a second path and ground, the second path connecting the third filter to the input of the second amplifier; and
a third inductor connected between the first path and the second path.

2. The radio-frequency module according to claim 1,
wherein when the first amplifier is in an ON state, the first common terminal is connected to the first selection terminal or to the second selection terminal, the second switch is in a non-conducting state, and the third switch is in a conducting state, and
wherein when the second amplifier is in an ON state, the third switch is in a non-conducting state, and the second switch is in a conducting state.

3. The radio-frequency module according to claim 1, further comprising:
a fourth switch having a second common terminal, a third selection terminal, and a fourth selection terminal; and
a fourth filter connected to the fourth selection terminal,
wherein the second path connects the second common terminal to the input of the second amplifier,
wherein the third filter is connected to the third selection terminal, and
wherein the second inductor is connected between the second common terminal and the input of the second amplifier.

4. The radio-frequency module according to claim 3,
wherein when the first amplifier is in an ON state, the first common terminal is connected to the first selection terminal or to the second selection terminal, the second switch is in a non-conducting state, and the third switch is in a conducting state, and
wherein when the second amplifier is in an ON state, the second common terminal is connected to the third selection terminal or to the fourth selection terminal, the third switch is in a non-conducting state, and the second switch is in a conducting state.

5. The radio-frequency module according to claim 1, wherein the third inductor has an inductance value greater than an inductance value of the first inductor and greater than an inductance value of the second inductor.

6. The radio-frequency module according to claim 1,
wherein the second switch is connected between a portion of the first path and ground, the portion of the first path connecting the first inductor to the input of the first amplifier, and
wherein the third switch is connected between a portion of the second path and ground, the portion of the second path connecting the second inductor to the input of the second amplifier.

7. The radio-frequency module according to claim 1,
wherein the second switch is connected between a portion of the first path and ground, the portion of the first path connecting the first common terminal to the first inductor, and
wherein the third switch is connected between a portion of the second path and ground, the portion of the second path connecting the third filter to the second inductor.

8. The radio-frequency module according to claim 1, further comprising:
a first resistor connected in series with the second switch between the first path and ground; and
a second resistor connected in series with the third switch between the second path and ground.

9. The radio-frequency module according to claim 1, further comprising:
- a module substrate having a first major face, a second major face, and a third major face,
- wherein the first major face and the second major face are opposite to each other,
- wherein the third major face and the second major face are opposite to each other,
- wherein a distance between the first major face and the second major face is greater than a distance between the third major face and the second major face,
- wherein the first inductor and the second inductor are at the third major face, and
- wherein the third inductor is at the first major face.

10. The radio-frequency module according to claim 9, wherein the first filter, the second filter, and the third filter are at the first major face, and
wherein the first amplifier, the second amplifier, the first switch, the second switch, and the third switch are at the second major face.

11. The radio-frequency module according to claim 10, wherein the first amplifier, the second amplifier, the first switch, the second switch, and the third switch are in a semiconductor integrated circuit (IC) that is at the second major face.

12. A communication apparatus comprising:
- a signal processing circuit configured to process a radio-frequency signal; and
- the radio-frequency module according to claim 1 that is configured to transmit the radio-frequency signal between the signal processing circuit and an antenna.

* * * * *